(12) United States Patent
Sinn et al.

(10) Patent No.: US 7,500,815 B2
(45) Date of Patent: Mar. 10, 2009

(54) LIVESTOCK UNLOADING SYSTEM AND METHOD

(75) Inventors: Steven C. Sinn, Tremont, IL (US); Voris G. Feather, Tremont, IL (US); James Pyle, Harrodsburg, KY (US)

(73) Assignee: Turkey Scope LLC, Tremont, IL (US)

( * ) Notice: Subject to any disclaimer, the term of this patent is extended or adjusted under 35 U.S.C. 154(b) by 1403 days.

(21) Appl. No.: 10/044,675

(22) Filed: Jan. 10, 2002

(65) Prior Publication Data

US 2002/0098066 A1 Jul. 25, 2002

Related U.S. Application Data

(63) Continuation-in-part of application No. 09/596,350, filed on Jun. 17, 2000.

(51) Int. Cl.
*B65G 67/24* (2006.01)

(52) U.S. Cl. ............ 414/393; 414/355; 414/573; 119/846

(58) Field of Classification Search ............... 414/354, 414/355, 356, 373, 389, 393, 398, 572, 573, 414/574, 577, 578, 580; 119/845, 846; 104/162, 104/165, 170
See application file for complete search history.

(56) References Cited

U.S. PATENT DOCUMENTS

| | | | | |
|---|---|---|---|---|
| 869,689 | A | * | 10/1907 | Brown .................. 105/26.1 |
| 1,521,820 | A | * | 1/1925 | Lloyd .................... 414/329 |
| 1,991,157 | A | * | 2/1935 | Goodman ............... 414/398 |
| 3,253,577 | A | | 5/1966 | Lund |
| 3,272,182 | A | | 9/1966 | Lund |
| 3,292,965 | A | | 12/1966 | Powers |
| 3,420,211 | A | | 1/1969 | Hartvickson |
| 3,452,718 | A | | 7/1969 | Wight |
| 3,476,089 | A | | 11/1969 | Jerome |
| 3,706,300 | A | | 12/1972 | Wessinger |
| 3,722,477 | A | | 3/1973 | Weldy |
| 3,916,835 | A | | 11/1975 | Reynolds |
| 3,942,476 | A | | 3/1976 | Napier |
| 4,303,258 | A | | 12/1981 | Davis |
| 4,307,683 | A | * | 12/1981 | Parker, Jr. ............... 119/716 |
| 4,365,591 | A | | 12/1982 | Wills et al. |
| 4,380,969 | A | | 4/1983 | Thomas |
| 4,499,856 | A | | 2/1985 | Hecht |
| 4,600,351 | A | | 7/1986 | Nelson |
| 5,060,596 | A | | 10/1991 | Esbroeck |
| 5,115,745 | A | * | 5/1992 | Ellens et al. ............ 104/162 |
| 5,405,233 | A | * | 4/1995 | Cordell ................... 414/389 |
| 5,470,194 | A | | 11/1995 | Zegers |
| 5,577,593 | A | * | 11/1996 | Hooper .................. 198/346.1 |

(Continued)

FOREIGN PATENT DOCUMENTS

GB     2082535     * 10/1982

*Primary Examiner*—James Keenan
(74) *Attorney, Agent, or Firm*—Eugene M. Cummings, P.C.

(57) ABSTRACT

A livestock unloading system for unloading livestock from a storage unit of a transport vehicle to a processing plant or storage facility. The unloading system includes a conveyor system whereby livestock ride from the storage unit to their destination. The conveying system includes a telescoping end that extends into and retracts from a coop during the unloading process. A truck positioner positions the transport vehicle for the proper unloading process.

12 Claims, 17 Drawing Sheets

U.S. PATENT DOCUMENTS 5,660,147 A     8/1997   Wills et al.
5,678,974 A * 10/1997   Murano et al. .............. 414/362
5,915,338 A *   6/1999   Fitzsimmons et al. ....... 119/846
6,048,157 A *   4/2000   Jerome ....................... 414/393
6,109,215 A *   8/2000   Jerome ....................... 119/843

* cited by examiner

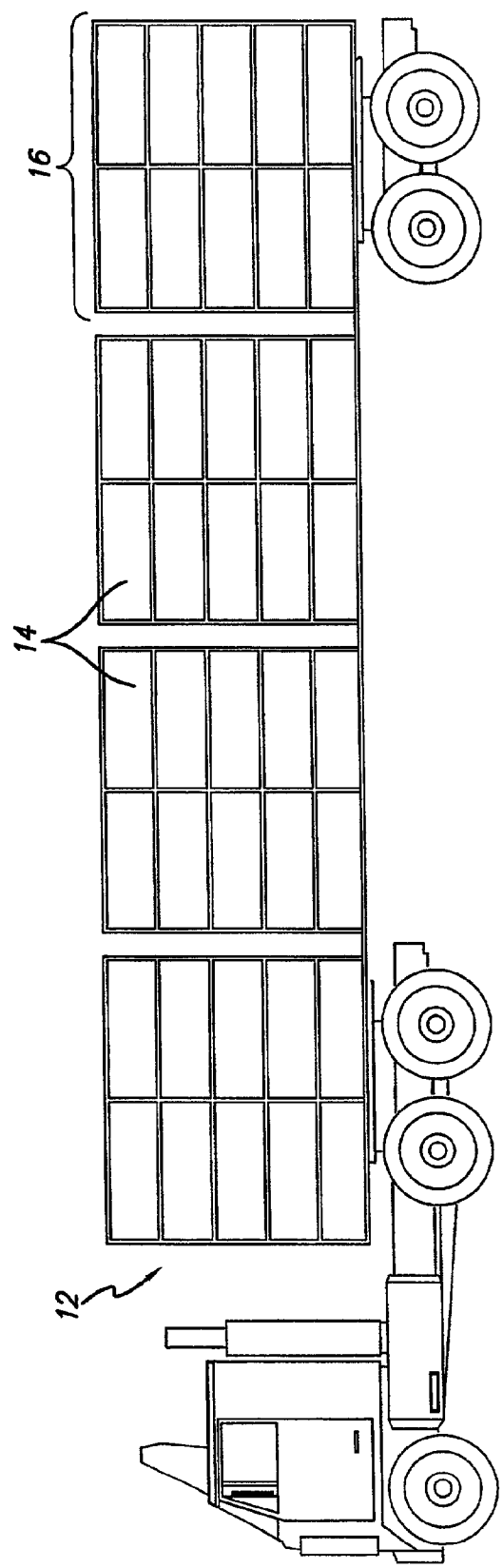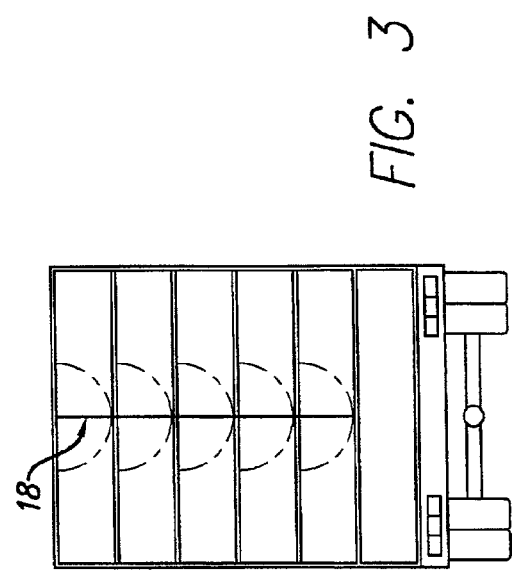
FIG. 2
FIG. 3

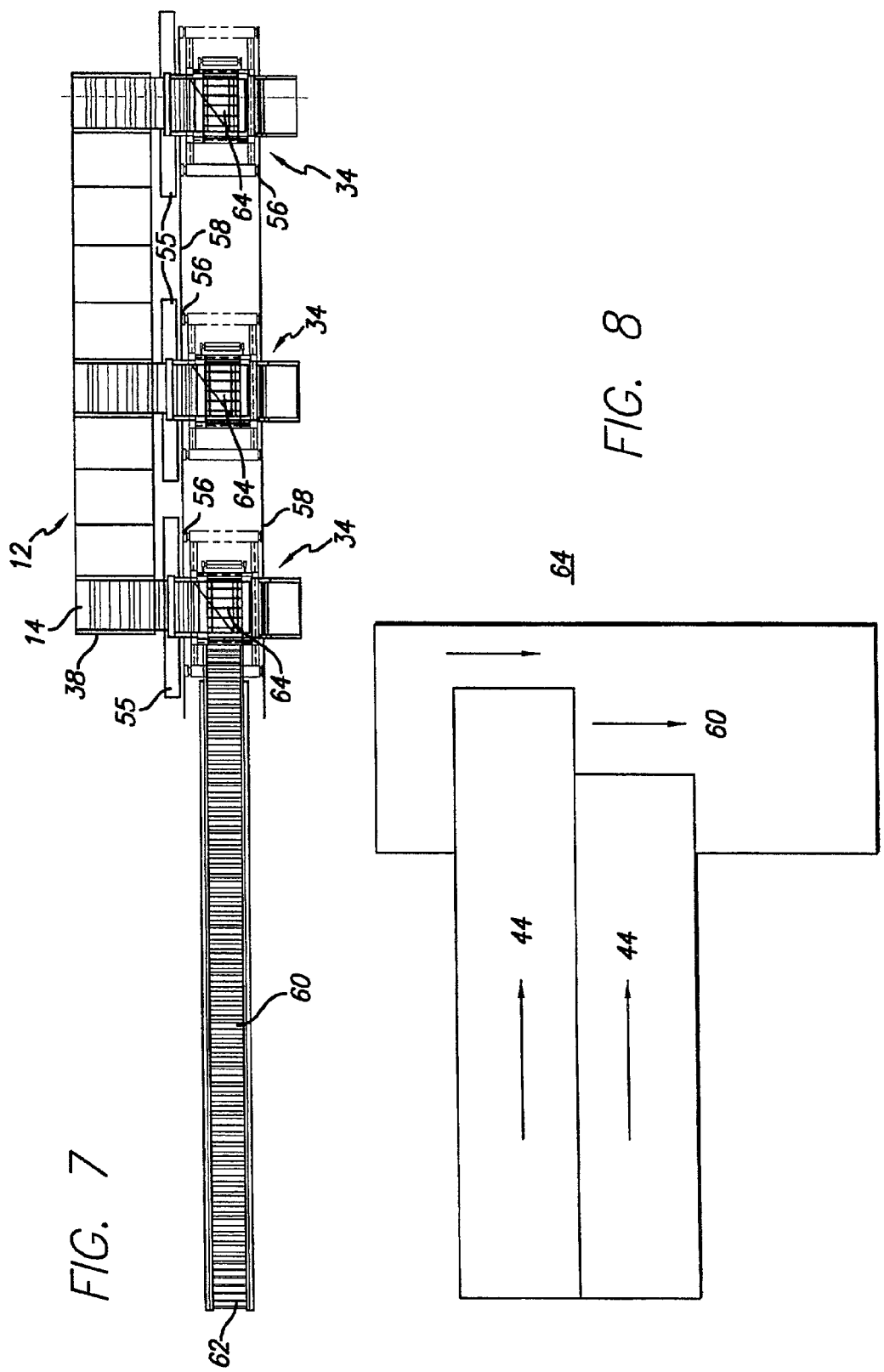

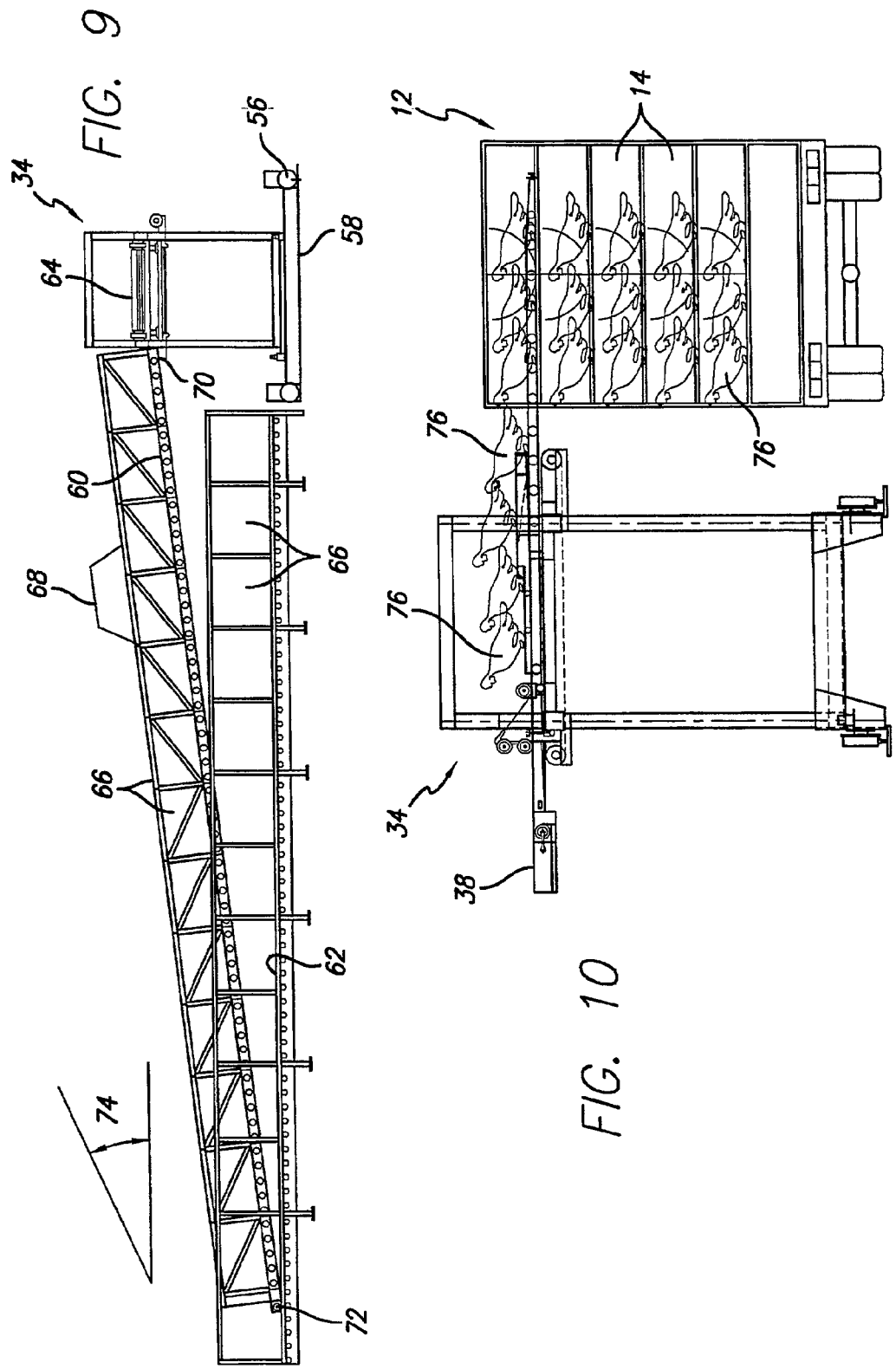

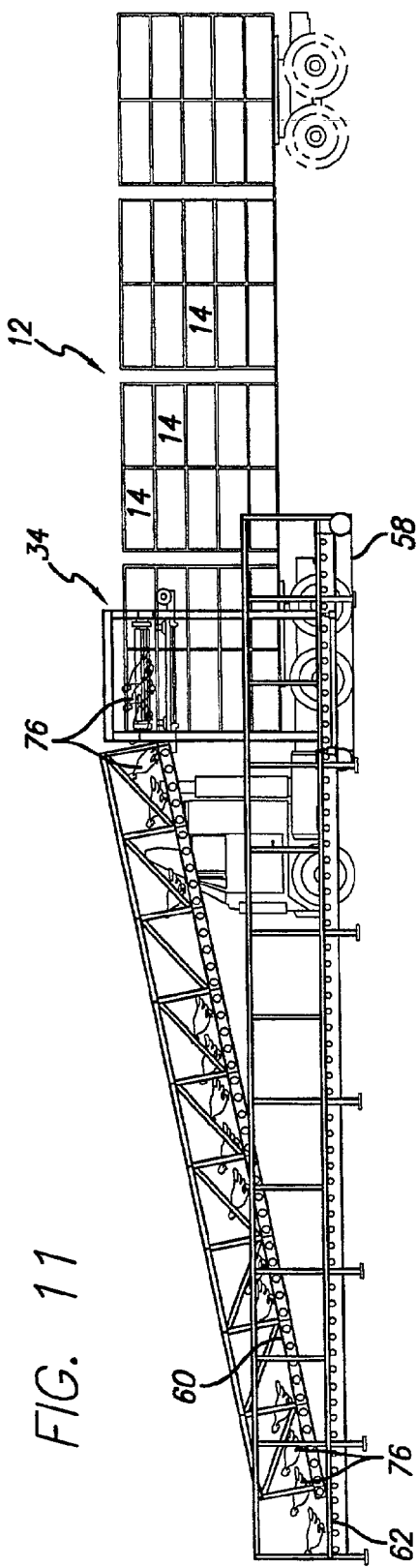
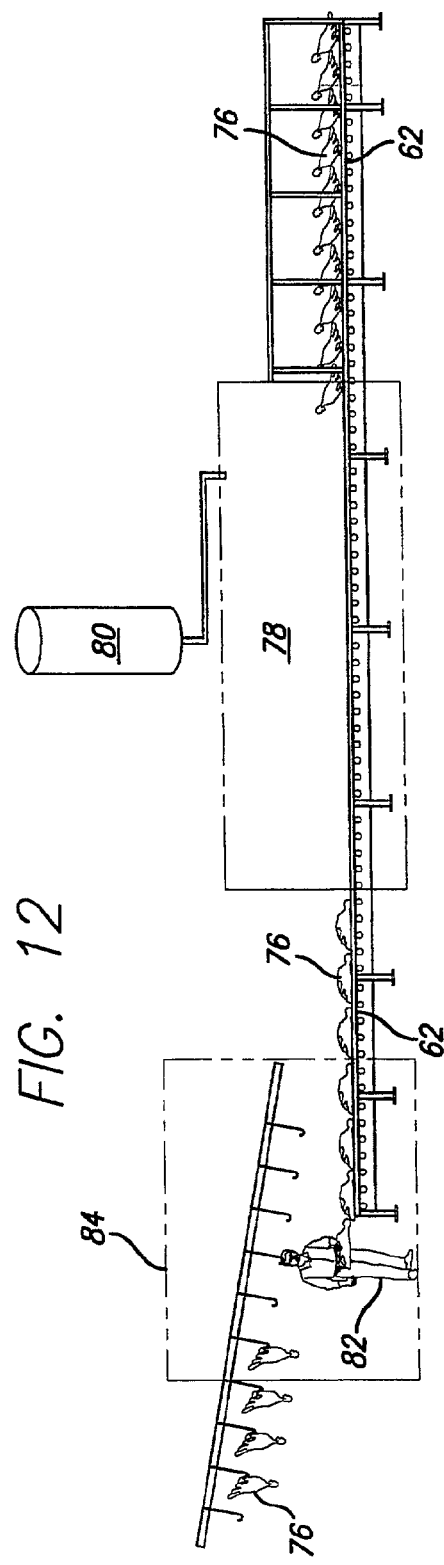

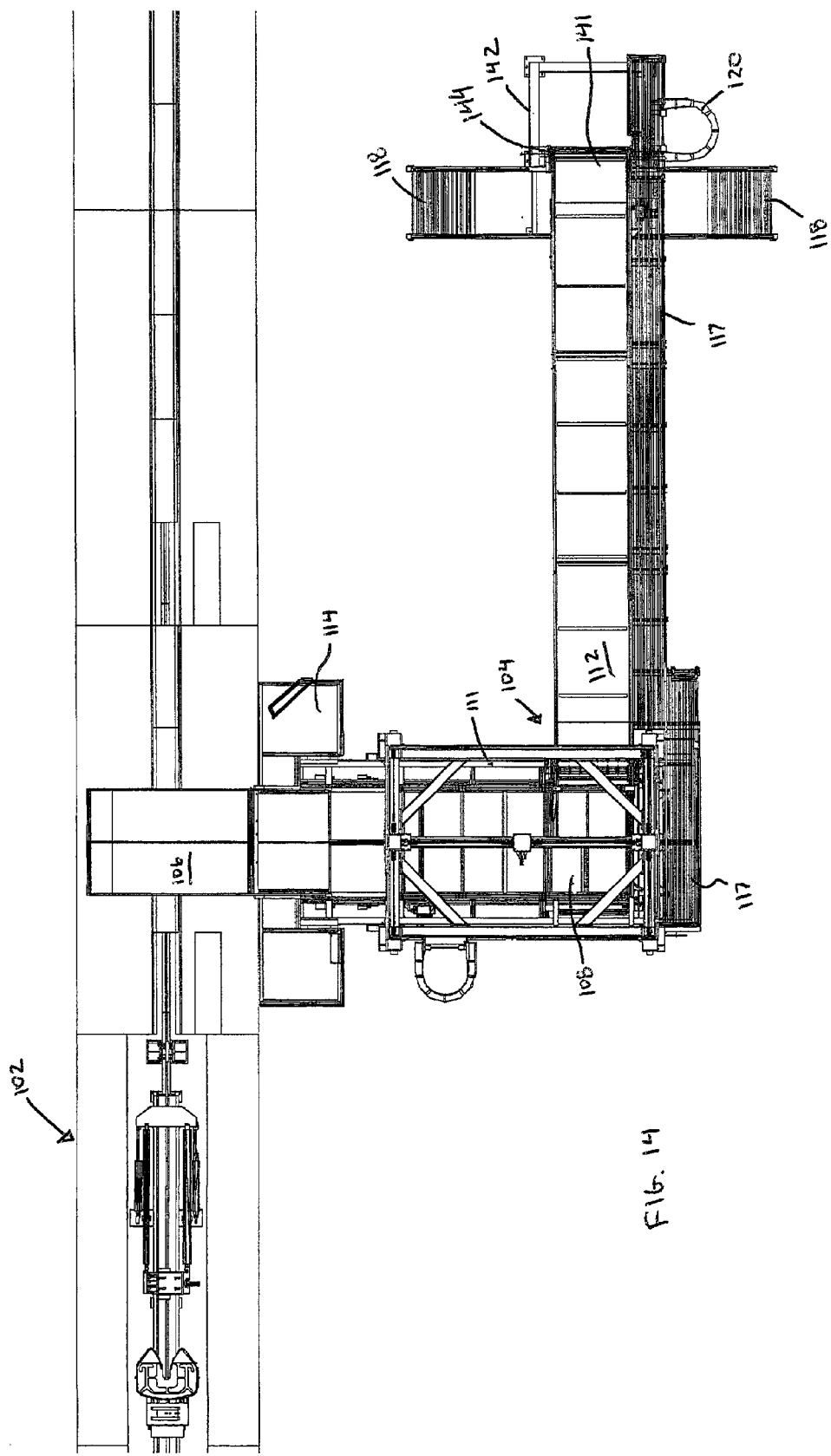

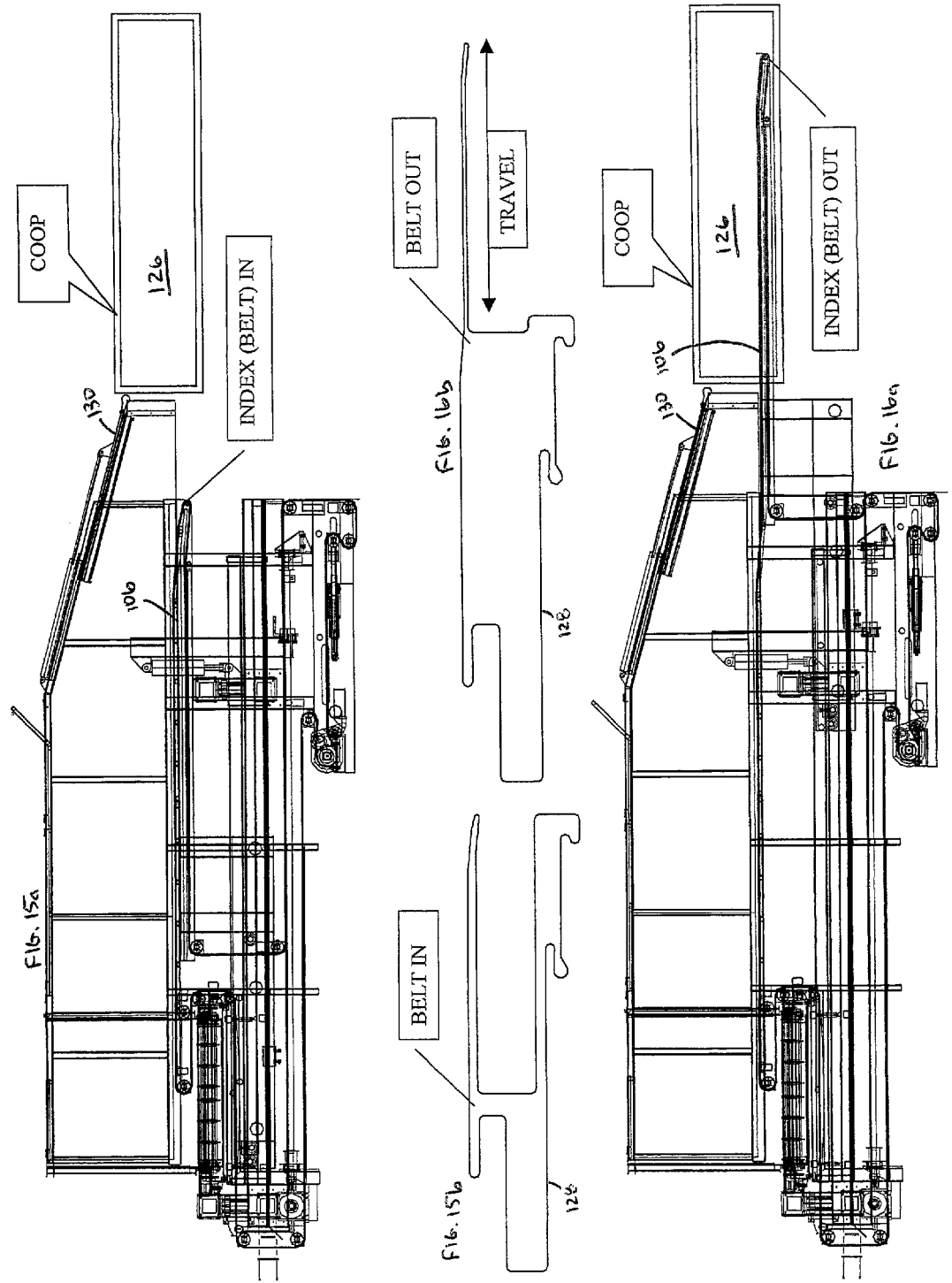

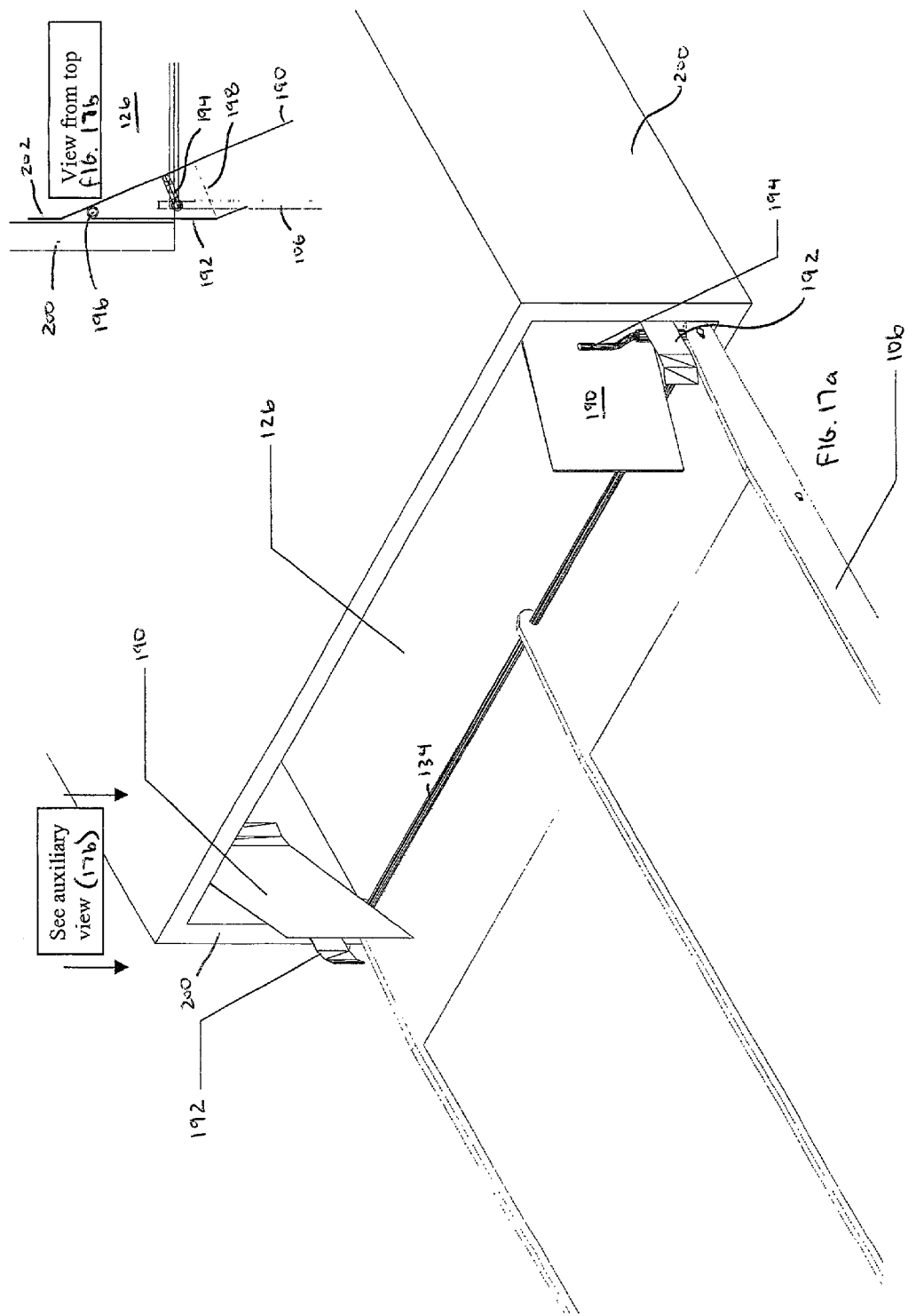

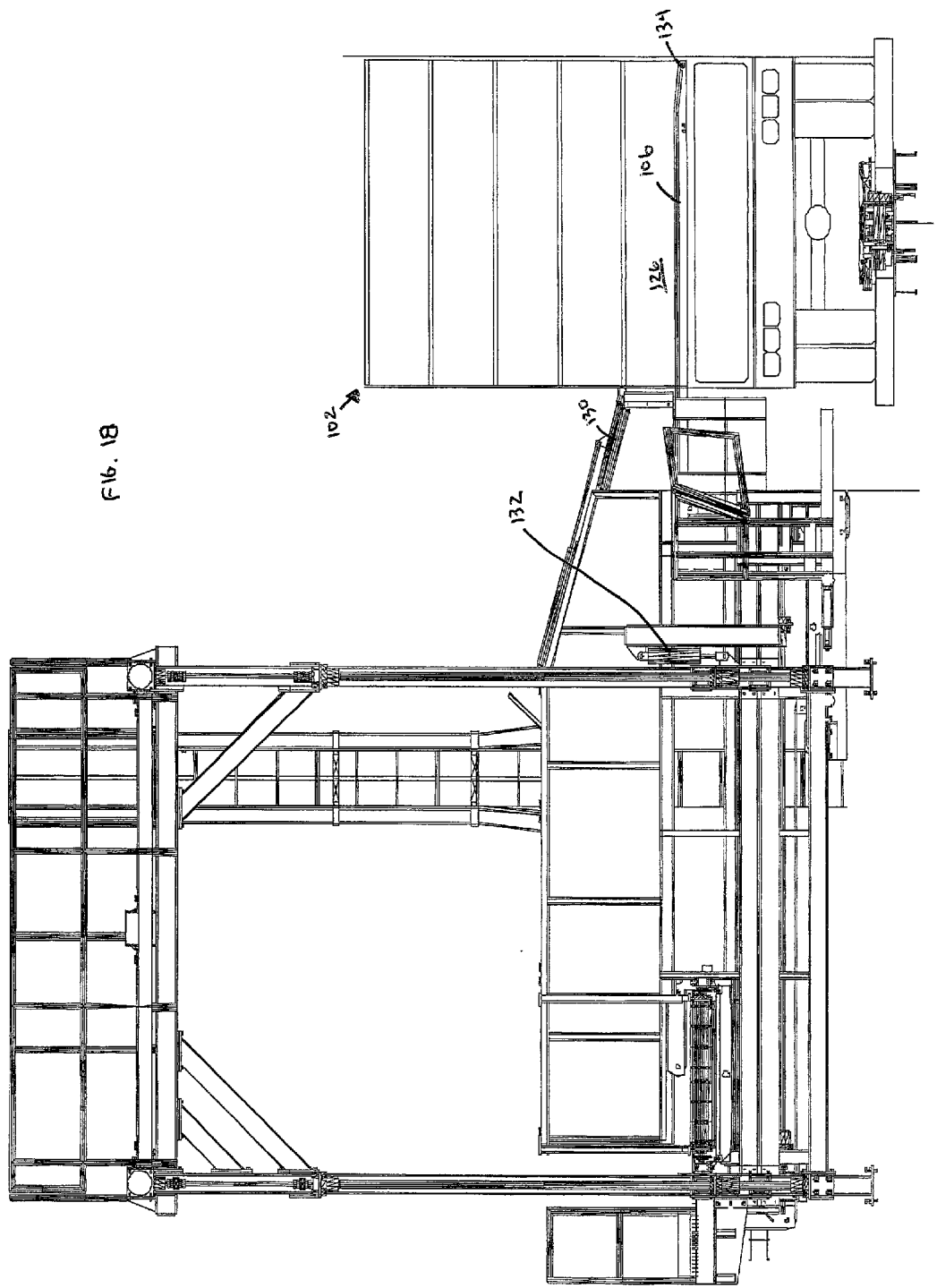

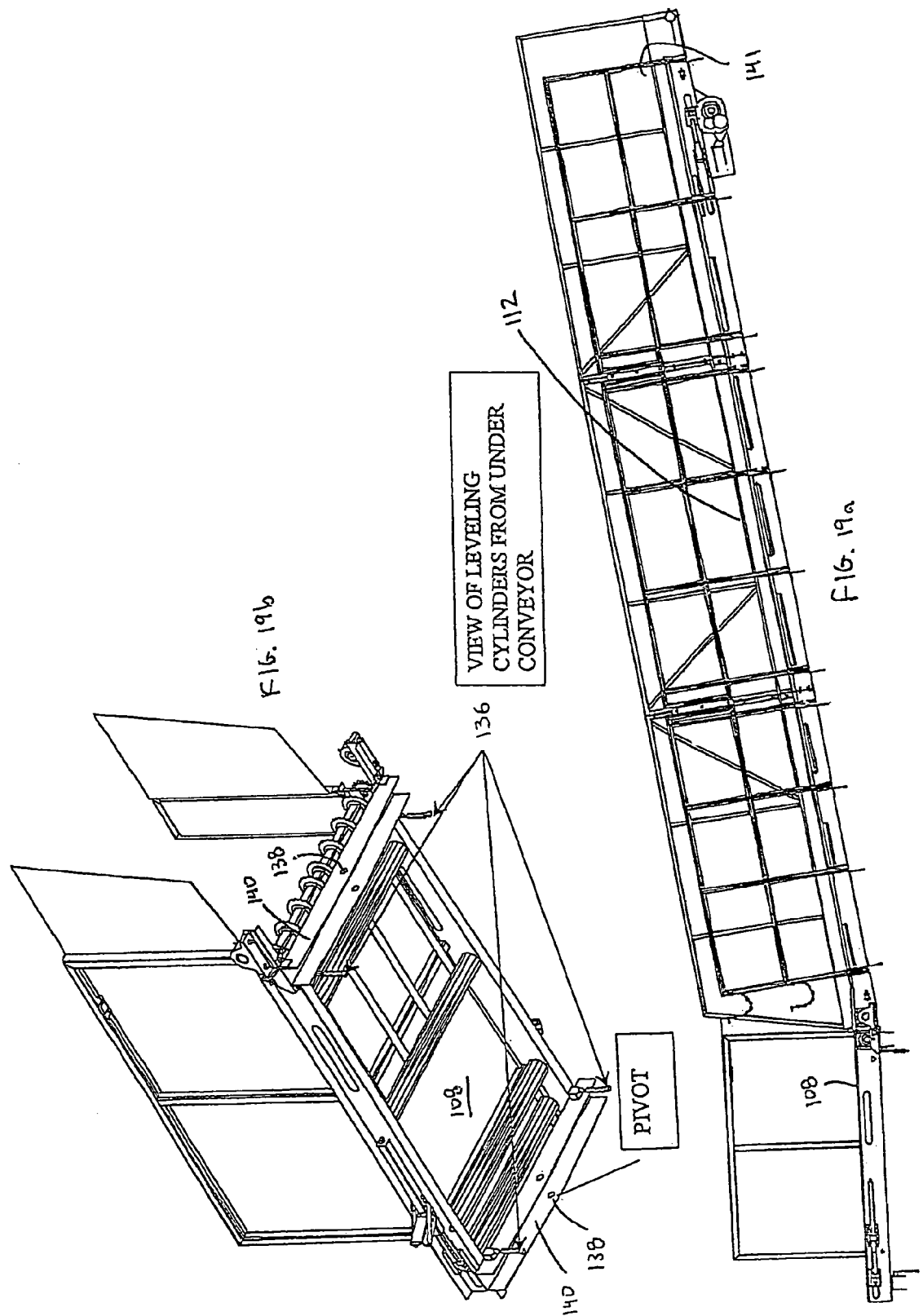

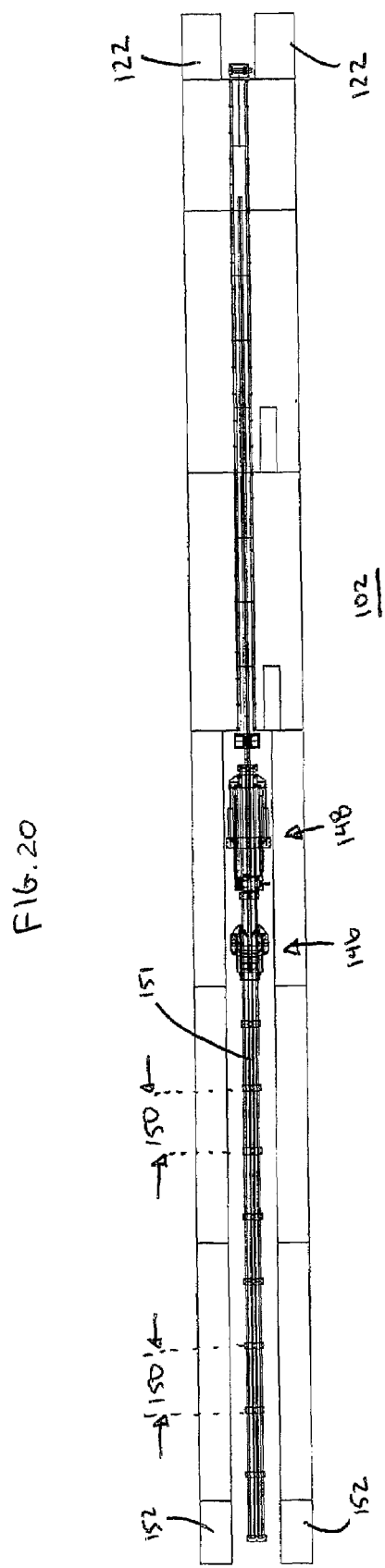

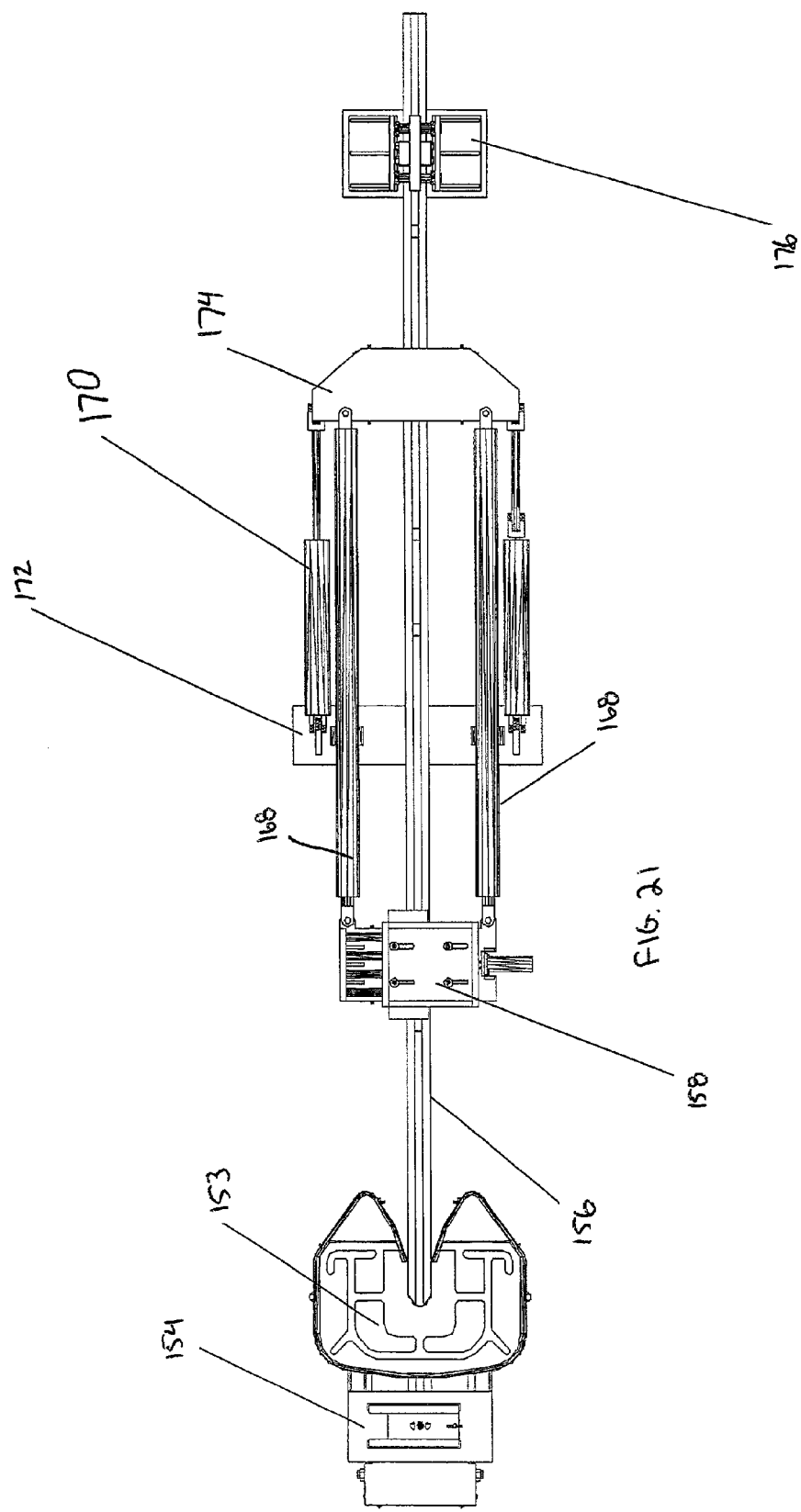

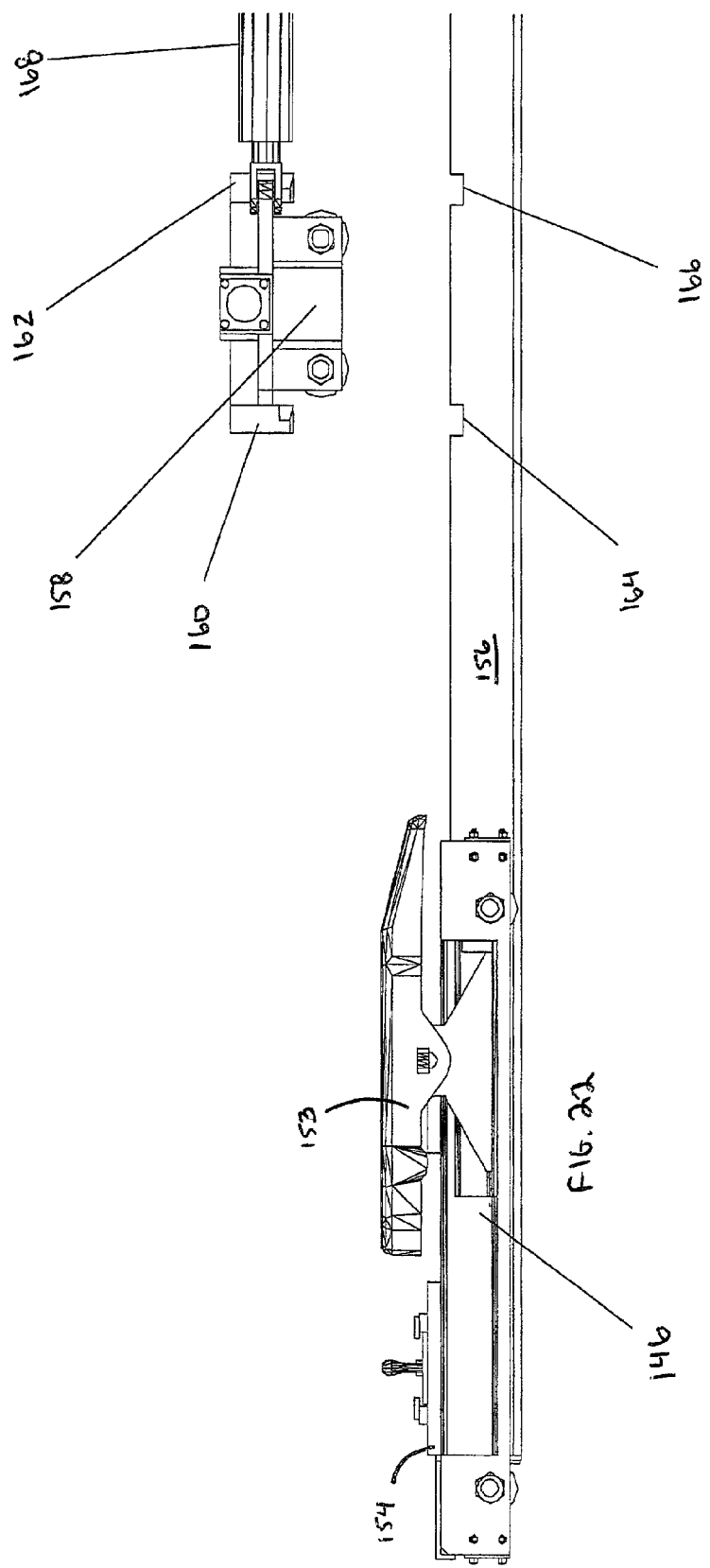

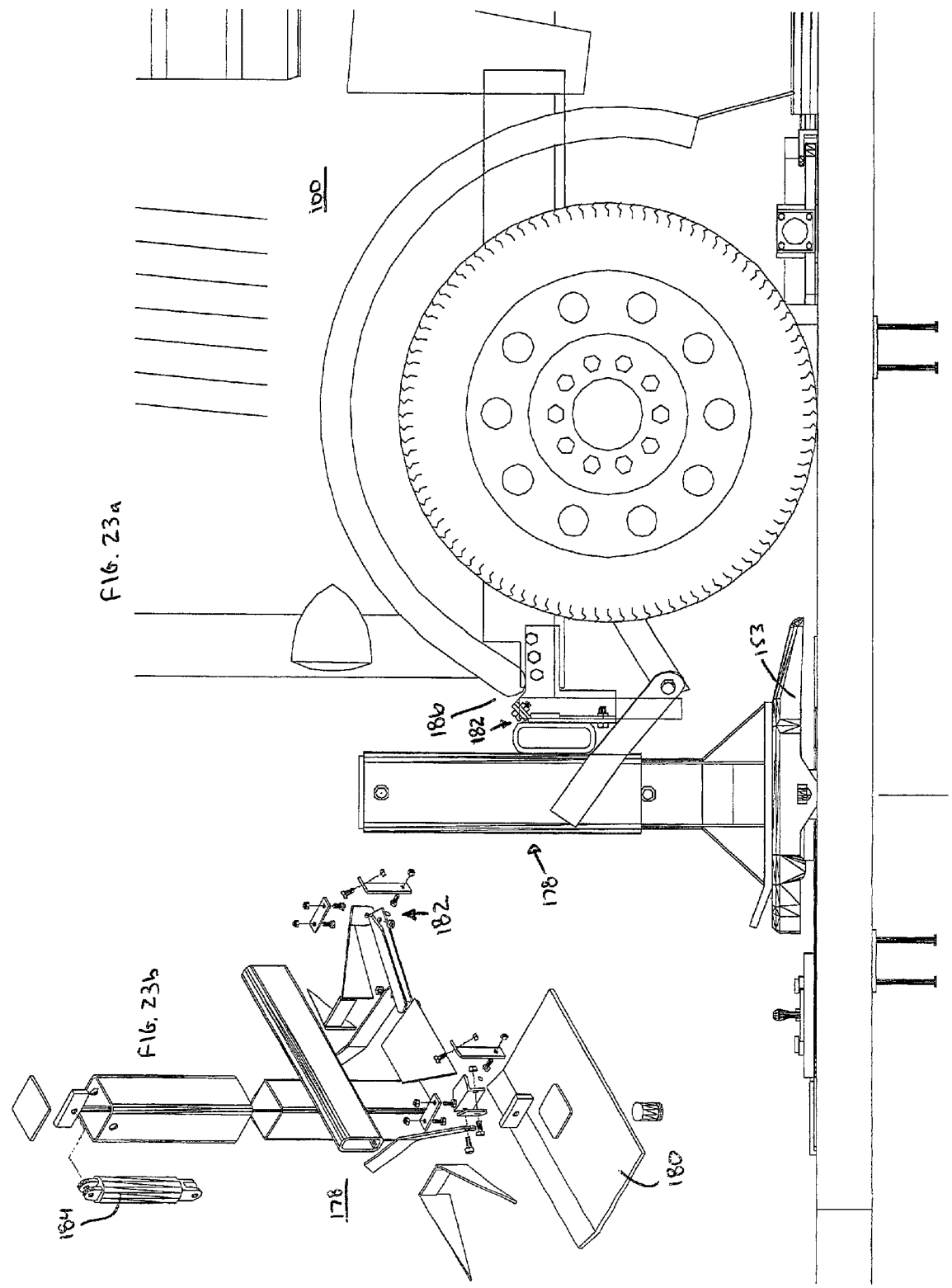

LIVESTOCK UNLOADING SYSTEM AND METHOD

CROSS-REFERENCE TO RELATED APPLICATION

This application is a continuation-in-part of U.S. Ser. No. 09/596,350, filed Jun. 17, 2000.

BACKGROUND OF THE INVENTION

The present invention relates generally to a system for handling livestock and more particularly to a system, means, device or apparatus to effect the efficient handling of livestock in the unloading of same from a transport vehicle to a farm site or processing plant.

It will be understood and appreciated that as the foregoing description of the present invention may be explained as it pertains to the handling of poultry, this description in no way shall be indicative of the limiting of "livestock" thereto.

Commercial poultry, such as turkeys, chickens, guineas, peafowl, ostriches, ducks, geese, swans and pigeons, have been one of man's main staples of protein throughout history. For centuries poultry was raised and processed on the farm and locally delivered to those who desired such fresh poultry. But as the population migrated to towns and cities, delivery of fresh poultry became increasingly difficult while the demand for processed poultry increased dramatically. In response to this need, fresh processed poultry now had to be transported to the markets located in these cities.

The poultry was customarily gathered manually at poultry houses, boxed or crated with numerous birds per crate, manually loaded aboard an open truck or van, and transported. The problems created by such a procedure were both numerous and significant. The manual handling of the poultry not only created a materially high cost involved in raising the poultry and preparing them for market, but it also created certain physical dangers to both the poultry as well as the workmen.

For example, during hand catching and subsequent handling of poultry, some birds are bruised, injured, or even killed due to a violent reaction of the birds or the unintentional rough handling by the workmen. Additionally, fowl inevitably beat their wings in an effort to escape upon capture, this would frequently result in a bird striking the handler with sufficient force to cause physical injury.

As technology was developed for the processing and safe storage of poultry, small processing plants developed and the manual loading and unloading of crates or coops began to improve. One of the first significant improvements, particularly in the turkey industry, was to create coops or crates which were permanently attached to a trailer or truck bed. These trucks contain large numbers of individual coops attached on the truck body. The coops having doors opening outward and being arranged in horizontal rows and vertical tiers. These coops or compartments typically having a permanent middle portion partition, and as such require loading from both sides of the truck. Not only is this time consuming, but loading from both sides also requires the trailer to turn around with all of its weight on one side thus causing an unsafe situation to driver, livestock, machinery and trailer.

The usual method of loading the poultry was to catch the animals individually and then lift and carry them to the coops while using makeshift platforms to reach the higher coops or to hand the birds to other workmen who are clinging to or standing on supports attached to the sides of the truck. The adult male turkey may weigh in excess of forty pounds, thus, any mishandling thereof causes a high incident of injuries to workers and animals alike, not to mention the considerable time requirements needed to accomplish the loading/unloading of a complete truck. The past thirty years has seen various conveyor belt apparatus designs to convey the poultry to the different heights of the vertical tier of coops. However, at the exit end of the conveyor belt, personnel still manually stuffed turkeys into the compartments or coops. Thus, while such apparatus eliminated the laborious task of lifting animals to the different heights of coops in the vertical tier, the arduous task of stuffing the live poultry continued.

In light of the preceding problems, there has been an effort in the art to develop a method of loading poultry for transport with a minimal amount of manual labor. For example, U.S. Pat. No. 5,902,089, issued May 11, 1999 describes a poultry loading apparatus for transporting poultry from a confinement area such as a poultry house to a transport vehicle to allow transport of poultry from farm-to-farm or from farm-to-processing plant. This is accomplished through the use of a base and a sectional mainframe defining a transport conveyance system. A section of the mainframe is pivotably attached to another section which is pivotably attached to the base. The apparatus further utilizes a control system for its overall leveling and pivotal height adjustments, as well as the extending/retracting capabilities of its conveyance.

Such a conveyance system certainly provides for an apparatus and system for loading poultry for transport that minimizes labor and costs while maximizing efficiency. However, once the fully loaded vehicle stops at its desired location, it must be unloaded. Although this conveyance apparatus is certainly capable of such unloading, it may be difficult to maneuver this apparatus within the typically less spacious area of a processing plant. In any event, the unloading process during the past two generations has not changed. The animals are manually grabbed and pulled out of the crates or coops and inverted on a shackle. Consequently, the animals are under high stress and typically react violently, thereby causing possible injury to itself and/or the unloader. Thus, there exists a need for a poultry unloading apparatus and system that reduces labor costs and damaged product while increasing safety and efficiency.

Today, the poultry business is a multi-billion dollar industry. Large companies dominate the production, slaughter and marketing of products. Since poultry companies are now fewer in number, they therefore demand large quantities of animals daily for processing. In fact, enormous numbers of poultry are transferred daily from production facilities to the slaughter plant or to different production facilities en route to the slaughter plant.

With the advance of science and particularly the art of genetics the animals are becoming larger earlier in life. In fact, the average weight of a male turkey (for example) may exceed fifty pounds within the next five years. This requires a high demand for automation by the processors, and fundamental changes are now occurring as the production and processing consolidates. There will be more focus on creating supply chains from the farm to the retail shelf that can elevate quality, consistency and demand responsiveness to previously unforeseen levels. At the same time, there is growing evidence that retailers (and ultimately consumers) are becoming increasingly proactive about the processes that generate the meat they are purchasing. More specifically, some consumers have become increasingly proactive with respect to the welfare of the animals they are consuming.

In view of the aforementioned needs and the shortcomings of the prior art, it is therefore an object of the present invention to provide a system that overcomes the deficiencies of the current practices whereby an apparatus and system is provided for unloading livestock for transport with a minimum amount of labor and with maximum efficiency at a minimum cost.

It is another object of the present invention to provide a livestock unloading system which maximizes efficiency and decreases damage to the animals during processing. It is another object of the present invention to provide a livestock unloading system which minimizes labor costs by reducing the number of employees as well as the turnover rate of employees.

It is yet another object of the present invention to provide a livestock unloading system whereby the manual and perhaps rough handling of the livestock is eliminated thereby improving overall animal quality by reducing animal stress and minimizing any damages sustained to the livestock. This reduction of stress decreases fecal contamination which in turn increases food safety.

Still another object of the present invention is to provide a user friendly livestock unloading apparatus that may be operated effectively by very few personnel.

Another object of the present invention is to provide an answer to the animal welfare conscious public regarding the handling of livestock.

These and other objects, features and advantages of the present invention will be clearly understood through a consideration of the following detailed description.

SUMMARY OF THE INVENTION

According to the present invention, there is provided a livestock unloading system having a stationary unloader unit with a base and a primary index. A vehicle positioning apparatus includes a support surface adjacent the unloader, a movable member for traveling across the surface, a joining member for attaching the vehicle to the movable member, and a means to move the member whereby the vehicle is positioned such that the unloader unit can systematically unload the livestock.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, in the several figures of which like reference numerals identify like elements, and in which:

FIG. 2 is a side view of a transport vehicle constructed in accordance with the principles of the present invention.

FIG. 3 is a rear view of the transport vehicle of FIG. 2.

FIG. 7 is a top view of the livestock unloading system of FIG. 6 illustrating three system unloading positions.

FIG. 8 is a top view of a conveyor transfer point of a preferred embodiment of the present invention.

FIG. 9 is a side view of the livestock unloading system of FIG. 6.

FIG. 10 is a back view unloading plant plan of the system of FIG. 9.

FIG. 11 is a side view unloading plant plan of the system of FIG. 9.

FIG. 12 is a side view of the unloading conveyor of FIG. 11 as it advances down the processing line.

FIG. 14 is a top view of the livestock unloading system of FIG. 13.

FIG. 15a is a side view of the primary index assembly of the system of FIG. 13 shown in a retracted position.

FIG. 15b is a side view of the belt configuration of FIG. 15a.

FIG. 16a is a side view of the primary index assembly of the system of FIG. 13 shown in an extended position.

FIG. 16b is a side view of the belt configuration of FIG. 16a.

FIG. 17a is a perspective view of the primary index as it engages the plow mechanism of the present invention.

FIG. 17b is a top left side view of FIG. 17a.

FIG. 18 is a rear view of the transport vehicle and the unloading apparatus of FIG. 13.

FIG. 19a is a side view of the primary and the incline take away conveyors of the unloading apparatus of FIG. 13.

FIG. 19b is a bottom perspective view of the primary take away conveyor of FIG. 18a.

FIG. 20 is a top plan view of the truck positioner of FIG. 13.

FIG. 21 is a close-up top view of the coupler assemblies of FIG. 19.

FIG. 22 is a side view of the coupler assemblies of FIG. 20.

FIG. 23a is a side view of a truck coupled to one half of the truck coupler.

FIG. 23b is an exploded view of the half of the truck coupler of 23a.

DESCRIPTION OF THE PREFERRED EMBODIMENTS

Figure 1:
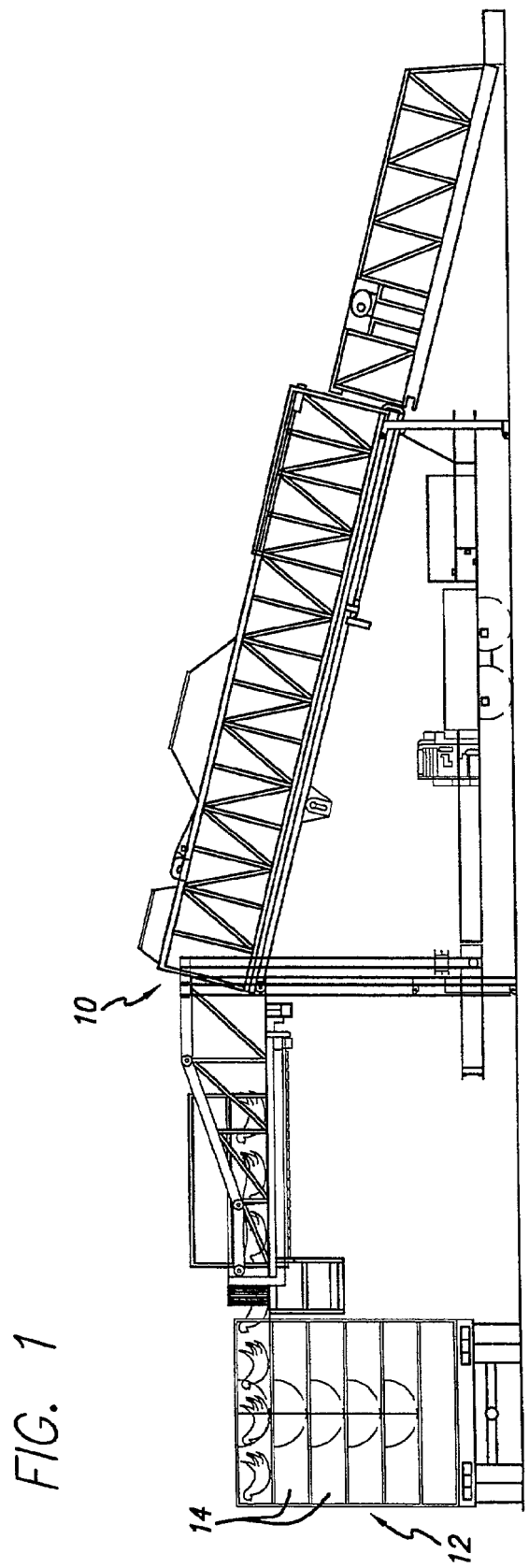
FIG. 1 is a field loading plan view of a livestock loading system including the loading apparatus and transport vehicle.

The present invention provides for a system of unloading livestock from a transport vehicle to a farm site or processing plant. As the livestock first require to be loaded upon the vehicle, FIG. 1 illustrates a livestock loading system much like the one disclosed in applicant's co-pending application Ser. No. 09/277,427, incorporated herein by reference. The system is shown in its operable state and includes a loading apparatus 10 perpendicular to a transport vehicle 12 having numerous rows of poultry (for example) coops 14. During loading, turkeys (for example) are telescoped by a plastic, steel or rubber conveyor belt into enlarged coops and comfortably placed on the coop floor. Once the loading process is complete, the transport vehicle 12 departs to eventually arrive at an unloading destination such as another farm or a processing plant.

The present invention includes, among other things, a uniquely designed transport vehicle. FIGS. 2 and 3 generally illustrate the advantages of this transport vehicle design. In particular, FIG. 2 depicts a side view of the transport vehicle or trailer 12 showing how the transport units or coops 14, sometimes referred to as "racks" in the art, are arranged on the bed of the truck. The truck or trailer may be of conventional design or of a customized design. In this particular embodiment, there are 10 coops 14 per coop module 16. FIG. 3 shows an optional swinging partition 18 of the coops which may swing in either direction or perhaps locked in a perpendicular position, depending upon the set-up of the loading/unloading procedure.

A standard coop trailer typically includes one hundred forty four coops per trailer, with each coop having a volume of about 16 cubit feet. This standard trailer requires the loading of one side of the trailer and turning the trailer around to load the opposite side. By contrast, the present system includes a coop trailer 12 with coops 14 having a volume of about 64 cubit feet. The swinging partition 18 of this trailer 12 allows the extension of the primary index of the unloading apparatus through the whole width of the coop, thus allowing the trailer to be completely unloaded from one side. With fewer and larger coops, loading/unloading speeds can match processing plants line speed; and biosecurity and cleaning of coop modules are easier and require less time.

Figure 4:
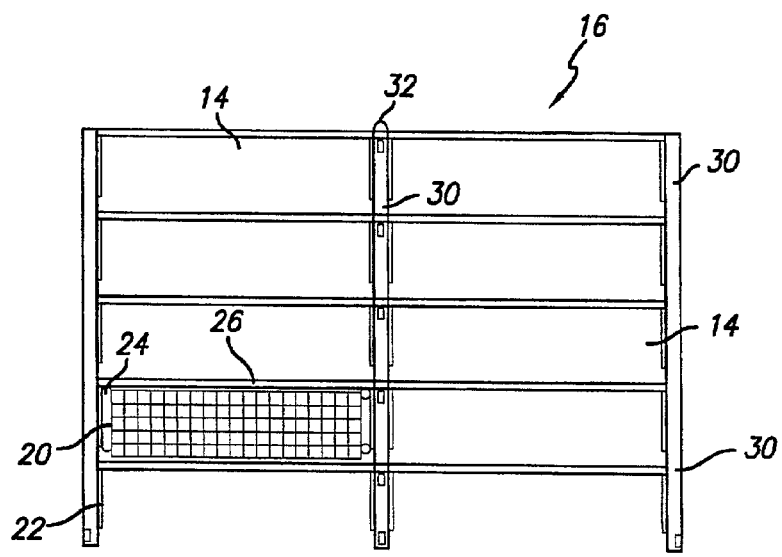
FIG. 4 is an enlarged side view of a module of the transport vehicle of FIG. 2.
Figure 5:
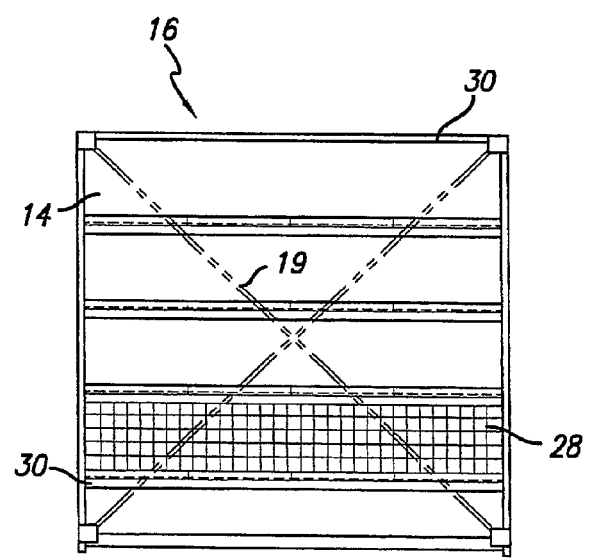
FIG. 5 is an enlarged rear view of the module of FIG. 4.

More particularly, the preferred embodiment of the coop module 16 design of the present invention is illustrated in FIGS. 4 and 5. FIG. 4 shows an enlarged side view of the coop module 16 of the coop trailer 12. This particular module 16 has ten (10) openings on each side, one for each of the ten coops 14. However, to reduce construction costs and to conform to different lengths and styles of trailers, modules may be built together or in single rows. Thus, modules could have 20 to 40 coops instead of 10, with the possibility of one module per trailer. The coops 14 have openings on either side to enable the telescoping section of the unloading apparatus to extend from either side of the trailer 12 depending upon field conditions and operator's preference. The configuration of the coop is adaptable to a multitude of trailer sizes. For example, a drop deck trailer can utilize 5 coops stacked on the top deck and 6 coops stacked on the drop deck. Such a configuration will increase the net hauling weight of the trailer, which in any event is dependent on particular state laws. Additionally, different trailers attached to the coop modules may enhance other safety features such as reducing the center of gravity and increasing stability. The module 16 of the preferred embodiment is currently 11 feet 4.75 inches wide, but may obviously vary depending upon the length of the trailer 12. Each module 16 is preferably braced for stability with members in the form of an "X" 19 as shown in FIG. 5.

The coop floor support, not shown, is currently a checker pattern flat iron structure, while the coop floor is a thin durable and washable plastic compound. The floor is slid into place from the side and held in place by metal tabs or other means of securement. The floor may be more securely held atop the structure via screws in its middle, or rubber mounts attached above to allow the floor to flex to a minimal bend, particularly during the updraft wind pressure caused during transport without the livestock.

The coop door 20 is constructed of thin steel bars in a checker pattern to both give it strength and allow the flexibility to bend while maintaining shape. A runner guide 22 or the like is positioned on both sides of the door currently consisting of a thin rod to slide the door 20 opened and closed through the door's ringlets 24 or the like. To prevent any possible damage from the extension of the unloading apparatus, this guide is positioned roughly four inches off the floor. A hook 26 or the like locks the door 20 in the open position to prevent it from sliding down during loading/unloading and to prevent the animals from ensnaring themselves and/or dropping on personnel.

An additional mesh 28 is used for the sides of the coop. This mesh 28 is stationary and welded to the tubular steel frame 30 of the module. The size of the mesh is such that it allows for free air movement yet small enough where animal body parts cannot become entangled during transport and/or loading/unloading. This mesh may be enclosed by wooden or plastic panels or a flexible curtain (not shown) during cold weather.

The coop module 16 of the present invention includes an attachment 32 in the middle support column. This attachment 32 enables the module to be lifted or placed on the flatbed trailer by a proper hoisting apparatus. The module is then attached to the trailer in a semi-secure manner to allow the module to move slightly during transport. This movement helps to deter stress cracks on the frame. The dimensions illustrated by FIGS. 4 and 5 are for the current coop module to be used with the unloading apparatus. Those dimensions are freely variable depending upon any particular condition.

Figure 6:
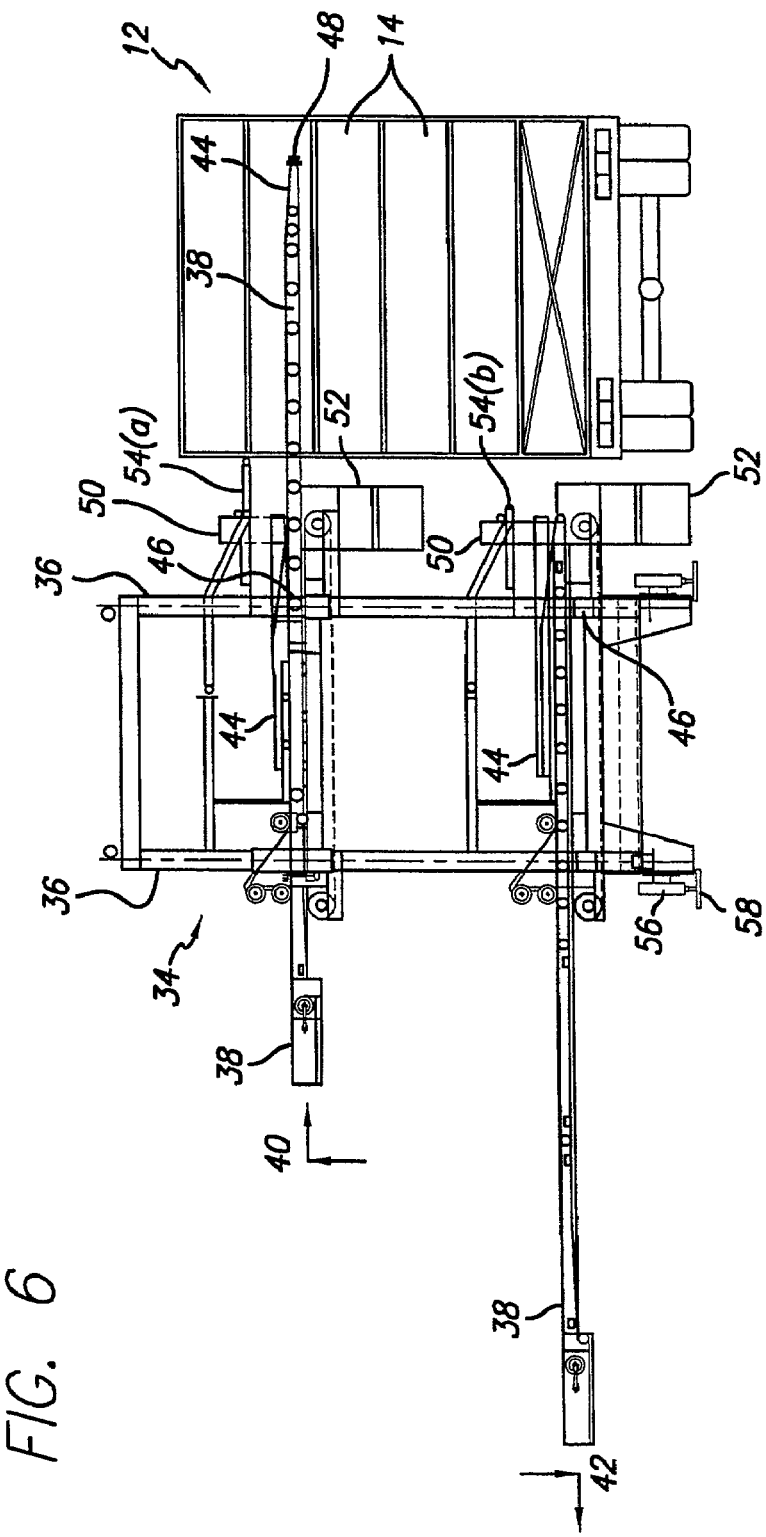
FIG. 6 is a back view of the livestock unloading system constructed in accordance with the principles of one embodiment of the present invention.

When such a transport vehicle 12 reaches a destination employing one embodiment of the present invention, it need only be positioned along side the base unloader unit 34 as shown in the rear view of FIG. 6. This may be accomplished through the use of guide bumpers and stop points (not shown). The mast mechanism 36 of base unloader unit 34 consists of, in one of the preferred embodiments, four ball screw mechanisms (although other lifting mechanisms may be employed) powered from one or more gearboxes. Not only do the ball screws lift the primary index 38 up and down (discussed more particularly below), but also are able to raise and lower the mobile discharge belt 60 (see FIG. 9). As such, these ball screws are capable of lifting a large amount of weight in livestock and equipment. Because there are four ball screws, one in each corner of the mast, 36, they are required to be synchronized to raise and lower simultaneously, thus providing for a smooth height transition.

The primary index 38 extends from the base unloader unit 34 into the coop 14 of the trailer 12 in order to unload the livestock. FIG. 6 illustrates the primary index 38 in both the raised and extended position 40 as well as the retracted and lowered position 42. The primary index 38 is surrounded by a cleated plastic conveyor belt 44 which when inserted into the coop 14, will pick the poultry up from the coop floor and transport them towards the base unloader unit 34 where they will be transferred onto a generally perpendicularly positioned mobile discharge belt.

The primary index 38 includes a tilt mechanism 46 to aid in the leveling of the index as it is telescoped into the coop 14. Obviously, this type of movement requires precision coordinating. In other words, as the primary index is inserted on top of the coop floor, the tilt mechanism will maintain an equidistance from the bottom of the index to the coop floor via leveling switches which in turn activate the tilt cylinder. For example, the tilt mechanism will activate during the trailers naturally slight shift as weight is removed, or as the index, or possibly the entire base unloader unit, is re-positioned due to the excess cantilever weight as well as the weight of the livestock. In addition, trailer 12 springs may occasionally be defective causing the trailer floor and coop module floor to angle laterally in either direction. In such a case, the tilt mechanism 46 adequately compensates this occurrence by providing a leveling means. In addition to the tilt mechanism 46, the primary index 38 itself includes leveling switches on its nose 48 which allow the index to easily glide on the top of the coop floor. Furthermore, the base unloader unit 34 and/or primary index 38 may be required to twist in order to align parallel with the trailer, therefore, the tilt mechanism is also capable of a radial adjustment.

The controls for the base unloader unit 34 are found in the form of an operator control box 50 which provides protection from cleaning and safety from untrained personnel. Such controls include electric DC voltage joystick controls to activate electric solenoids shifting spool valves, as well as adjustments for maximum belt speeds, mast speed and parallel movement of base unloader unit/mobile discharge belt. The system is operable under the framework of an electric hydraulic system typical of nearly all hydraulic machinery. The hydraulic system will be powered by an electric motor attached to a hydraulic pump and located in a safe location away from the wash down process. These controls are operable from the operator platform 52 located on the base unloader unit. When the trailer 12 is in position, usually around 6-inches away from the platform 52, the operator takes his/her position on the platform 52 and begins the unloading process. Basically, the trailer 12 is lined up perpendicular to the base unloader unit 34 and the operator opens the coop door and begins unloading the bottom coop by inserting the primary index 38 into the coop. The primary index conveyor belt 44 of this preferred embodiment is in the form of a single endless conveyor which through the cooperation of communicating rollers and pulleys provides for a constant length and tension as the index is extended and retracted.

A second belt, the telescoping top belt 54, is also in communication with the primary index such that when the primary index 38 is extended into the coop 14 it also extends to the top of the coop door. Top belt 54 is shown both in its extended position 54a and its retracted position 54b. This top belt 54 prevents poultry from escaping and helps push the animals to the back of the primary index where they will be deposited on the mobile discharge belt (discussed more below).

Once a coop is emptied, the primary index is completely retracted, an optionally manned wash platform 55 (FIG. 7) allows for the washing of the trailer, and the mast 36, index 38 and platform 52 are raised to the next coop. When a column of coops are unloaded, the base unloader unit 34 is moved laterally to the trailer to line up the next column of coops. This is accomplished via engaging the parallel movement mechanism of the base unloader unit 34. Since the base unloader unit 34 is supported by train car wheels 56, it is easily laterally transferred down the railroad track rails 58. This lateral movement may be automated by counters or electronic eyes or the like to enhance efficiency. FIG. 7 illustrates the parallel movement of the base unloader unit 34 as it moves from column to column down the trailer 12. In particular, the parallel movement mechanism of the base unloader unit 34 drives the wheels 56 on the track 58. Note that at each of these three illustrated positions, the primary index 38 is shown in an extended position within the top coop 14 of each column.

FIG. 7 also shows the mobile discharge belt 60 and the stationary discharge conveyor 62. Although the figures show that the base unloader unit is straddling the mobile discharge and stationary conveyor belt, it need not be. The mobile discharge belt 60 is designed to travel on top of the stationary discharge conveyor 62 so that the base unloading unit 34 can travel upon the tracks 58. The point of transfer 64 between the primary index belt 44 and the mobile discharge belt 60 is generally shown in the top view of FIG. 8. Basically, the primary index belt 44 conveys the poultry to the transfer point 64 upon the base unloader unit where they will leave the primary index belt 44 and begin their trek on the mobile discharge belt 60. This simplified schematic of FIG. 8 illustrates the poultry dropping on two points of the mobile discharge belt 60. This two-point drop of the preferred embodiment enables a smoother transition of the 90° turn than that of merely dropping the poultry on one location which would necessarily require the mobile discharge belt 60 to operate excessively fast. The number of dropping points may be increased or decreased depending on the modular plastic unit sizes and in-field requirements of conveying poultry to the stationary belts en route to further processing. Furthermore, in the case of processing plants that demand a large volume of poultry to maintain plant line speeds, this embodiment of the present invention is adaptable to adding a second primary index or perhaps employing two base unloader units.

Once the poultry have crossed the point of transfer 64 on the base unloader unit 34, they are gently transported down via the mobile discharge belt 60. Referring now to FIG. 9, the base unloader unit 34, mobile discharge belt 60 and stationary discharge conveyor 62 are depicted in a side view to illustrate their interaction with one another. In particular, poultry are first unloaded from the coop via the primary index belt and transferred to the mobile discharge belt 60 through the point of transfer 64. When they reach the end of the mobile discharge belt 60, they are gently transferred onto the stationary discharge conveyor 62.

In this preferred embodiment, the mobile discharge belt 60 is enclosed on the sides and top with a high grade composite cover 66. Additionally, this conveyor is cooled by numerous fans 68 strategically positioned about its length to aid in the reduction of stress to the poultry and also to provide oxygen thereto. Furthermore, an automated wash system for biosecurity may be installed inside the tunnel. Thus, the poultry are kept calm and cool inside the darkened enclosed tunnel. The mobile discharge belt section is hinged 70 on one end to the base unloader unit 34 and includes rollers 72 at its other end. The rollers 72 allow the mobile discharge belt 60 to travel back and forth with the base unloader unit 34. The hinge enables the angle 74 of the discharge conveyor section to adjust as the mast raises and/or lowers in order to address the different levels of coops. As the hinged end of the discharge conveyor is raised or lowered, the opposite end either rolls towards the base unloader unit (if raised) or away from the base unloader unit (if lowered) upon the stationary discharge conveyor 62.

The function of the stationary discharge conveyor 62 is to act as the transfer from the mobile discharge belt as well as a delivery mechanism to down line processing such as a pre-shackled stunner followed by an automated shackler. This belt is also enclosed with a composite cover 66 to maintain a dark environment and is cooled by fans for the stress-free movement of poultry. An automated wash system may be installed for the particular biosecurity requirements of each plant inside this tunnel. This stationary belt may also be expanded to provide for extra storage space for poultry while empty trailers are switched for loaded trailers or provide a safety margin of livestock storage in case incoming trailers of livestock are delayed.

In order to more fully appreciate the advantages of this embodiment of the present invention, the remaining drawings (FIGS. 10-12) include illustrations of the poultry 76 during their different stages of the unloading process. Referring to FIG. 10, the poultry 76 are initially unloaded from the coop 14 of the trailer 12 by extending the primary index 38 of the base unloader unit 34 therein. The belt speed of the primary index is generally set at, for example, a predetermined speed of 25% greater than the speed of extension of the primary index. This along with a shovel roller (not shown) positioned at the end of the primary index, will ensure the safe pick up of the poultry from the coop floor. Note that the primary index 38 is fully extendable into the coop 14. This enables the unloading of a trailer 12 from a single side without the need to reposition the trailer 12. Once the poultry 76 reach the point of transfer 64 upon the base unloader unit 34, they are transferred onto the mobile discharge belt 60.

FIG. 11 illustrates all of the principal components of one of the preferred embodiments of the present livestock unloading system. The trailer 12 has pulled up to the unloading site and parked perpendicular to the base unloader unit 34, parallel to the mobile discharge belt 60 and stationary discharge conveyor 62, with the railroad tracks 58 to begin the process. Poultry 76 has been unloaded from the coops 14 and has transferred from the primary index belt 44 through the point of transfer 64 to the mobile discharge belt 60 onto the stationary discharge conveyor 62.

Typically, such a poultry unloading system as described in this embodiment will be utilized by a poultry processing plant. FIG. 12 is illustrative of one embodiment in which such a plant may incorporate. Referring thereto, the stationary discharge conveyor 62 transports poultry 76 into an in-line stun unit 78, which is supplied by a carbon dioxide tank 80 or other controlled atmosphere means. The poultry will then exit the stun unit 78 anesthetized into an in-line animal washer. This washer will clean the contaminants on the animals such as fecal matter and dirt; as well as disinfect the carcass After this, the animals can be easily shackled for further processing at the next station in the processing plant. This shackling may be accomplished through the use of a number of work personnel 82, or preferably through the use of an automated shackling unit 84.

One preferred embodiment of the present invention has been shown and described with respect to FIGS. 6-12. Such an embodiment provides for the mobile unloader unit to unload livestock from the transport vehicle. Another embodiment of the present invention will now be described with respect to FIGS. 13-23. Although this alternate embodiment utilizes a number of different main principles, many of the basic components and their cooperating movements are essentially the same. This alternate embodiment provides for a stationary unloader unit to unload livestock from a transport vehicle continually re-positioned via a truck positioner.

Figure 13:
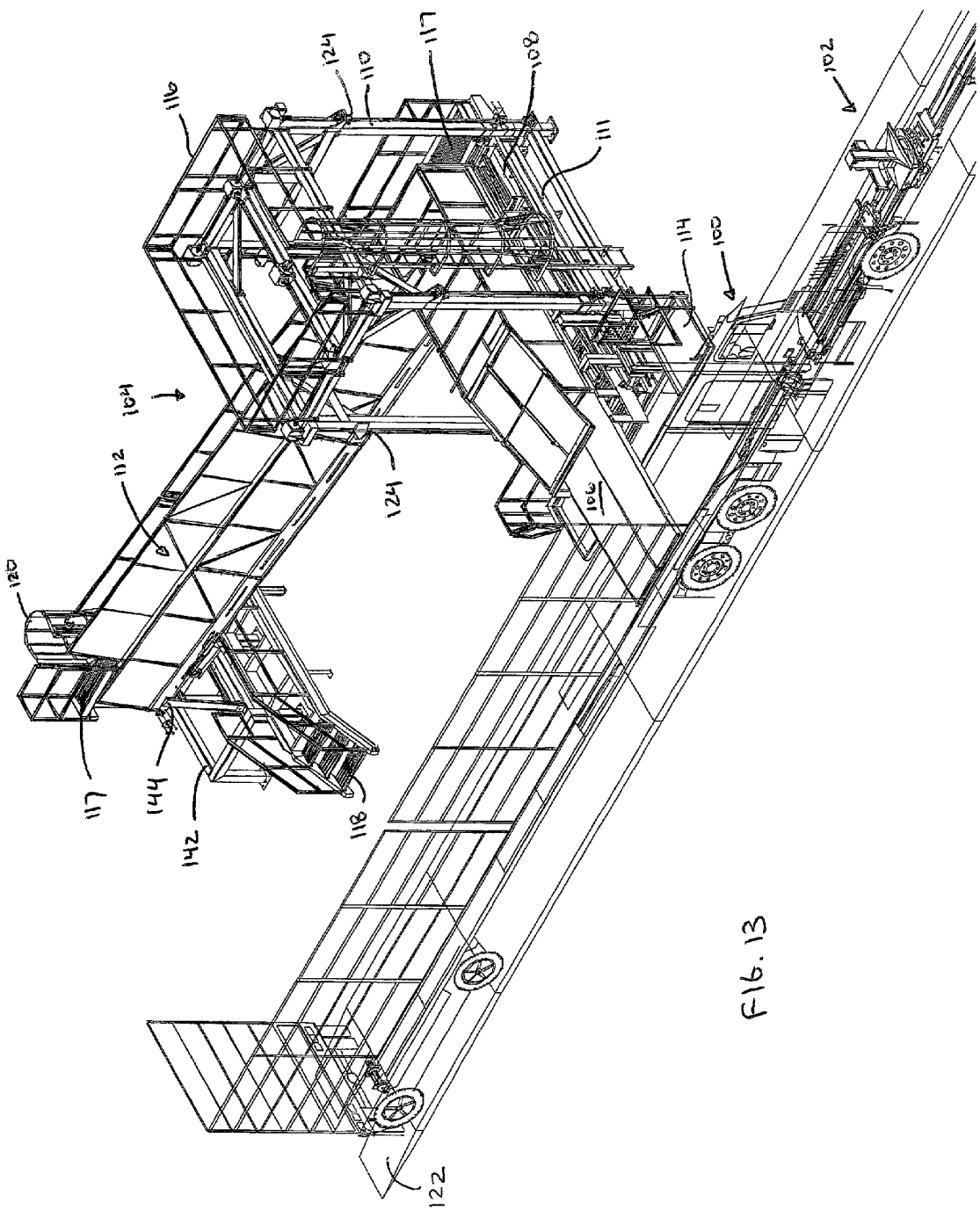
FIG. 13 is a perspective view of the livestock unloading system constructed in accordance with the principles of an alternate embodiment of the present invention.

The principle components of the alternate preferred embodiment are generally shown in the perspective view of FIG. 13, as well as the top plan view of FIG. 14. Referring thereto, the phantom transport vehicle or truck 100 is shown coupled to the truck positioner 102, which in turn is located adjacent the unloading apparatus 104. The unloading apparatus 104 of this embodiment consists of, among other things, a primary index 106, a primary take-away conveyor 198, a gantry 110, a carriage 111 and an inclined take-away conveyor 112. The frame of the unloading apparatus 104 further include an operator platform 114, maintenance platforms 116, observation platforms 117, stairs 118 and ladders 120. These allow the operators and maintenance personnel easy access to all of the components of the unloading apparatus.

There are two main differences between the two preferred embodiments of the present invention. One is the positioning of the transport vehicle relative to the unloading apparatus and the other is the movement of the primary index. In the first embodiment, the transport vehicle is parked and the unloading apparatus is maneuvered with respect thereto. In the alternate embodiment, as will be described, the unloading apparatus is affixed to the ground and the transport vehicle is maneuvered with respect thereto. Additionally, in the first embodiment, the whole of the primary index is extended and retracted, while in the alternate embodiment, as will be described, the primary index is a telescoping index.

Turning again to the alternate preferred embodiment, when a transport vehicle, as one described in FIGS. 2-5, reaches a destination employing the present invention, it straddles the truck positioner by first entering atop the ramps 122 and then locking in place. The truck positioner 102, like the unloading apparatus 104, is secure to the floor and the transport vehicle straddles the mechanism.

The gantry 110 of the unloading apparatus 104 consists of four ball screw mechanisms 124 (although other lifting mechanisms may be employed) powered from one or more gearboxes. Not only to the ball screws lift the carriage assembly 111, primary index 106, operator platform 104 and control box, and primary take-away conveyor 108 up and down (discussed more particularly below), but also are able to raise and lower the incline take-away conveyor 112. As such, these ball screws are capable of lifting a large amount of weight in livestock and equipment. As these are four ball screws, one in each corner of the gantry 110, they are required to be synchronized to raise and lower simultaneously, thus providing a smooth height transition.

The primary index 106 of the alternate preferred embodiment is shown in the retracted position in FIG. 15 and in the extended position in FIG. 16. When the transport vehicle 100 is in position, the operator takes his/her position on the platform 114 and begins the unloading process. The transport vehicle 100 is lined up perpendicular to the unloading apparatus 104 by the truck positioner 102 and the operator opens the coop door and begins unloading the bottom coop by inserting the primary index 106 into the coop. The primary index conveyor belt 128 of the embodiment is in the form of a single endless conveyor which, through the cooperation of communicating rollers and pulleys, provides for a constant length and tension as the index is extended (FIG. 16) and retracted (FIG. 15). This cleated plastic conveyor belt 128 of a telescopic belt configuration, when inserted into the coop 126, will gently pick the livestock up from the coop floor and transfer them onto a generally perpendicularly positioned primary take-away conveyor 108 which is coupled to the incline take-away conveyor 112. As previously noted, the primary index 106 extends the entire width of the transport vehicle, preferably about eight feet. A telescoping top belt 130 is also in communication with the primary index 106 such that when the primary index 106 is extended into the coop 126 the telescoping top belt also extends to the top of the coop door. This top belt 130 prevents livestock from escaping and helps guide the animals to the back of the primary index 106 where they will be deposited on the primary take-away conveyor 108. Alternatively, a telescoping guard member 130 made of smooth stainless steel may be interchanged with the telescoping top belt 130.

Another feature provided by the present invention is illustrated in FIG. 17. FIG. 17a is a perspective view of the primary index 106 as it is being inserted into the coop 126 opening. This plow mechanism feature consists of two plows 190, two activating slats 192, two pivot rods 194, two hinges 196 and two springs 198. During operation/insertion, the pivot rods 194 are placed between the activating slats 192 and the plows 190. As the index 106 moves into the coop 126, the nose 134 pushes against the activating slats 192 thereby moving the hinges 196 towards the sidewalls 200 of the coop 126. The pivot rods 194 are then activated to push the middle of the plows 190 towards the inside of the coop while the inside ends 202 of the plows 190 as well as the hinges 196 are forced against the side walls 200. The purpose of this feature is to urge the livestock, especially small poultry, onto the primary index 106. It also allows a reduction of the tight tolerance of the primary index alongside the coop wall 200.

The primary index 106 includes a tilt mechanism 132 (FIG. 18) to aid in the leveling of the index as it is telescoped into the coop 126. As the primary index is inserted on top of the coop floor, the tilt mechanism 132 will maintain an equidistance from the bottom of the index to the coop floor via leveling switches which in turn activate the tilt cylinders. For example, the tilt mechanism will activate during the transport vehicles naturally slight shift as weight is removed or perhaps upon the detection of failing trailer springs. In such a case, the tilt mechanism 132 adequately compensates for this occurrence by providing a leveling means. This tilt mechanism is activated by leveling switches on the nose 134 of the primary index 106. Additionally, and as shown on FIG. 19*b*, the primary take-away conveyor includes a self-leveling mechanism employing four small cylinders 136 that allows this conveyor to totter back and forth on the pin illustrated with the hole 138 in the middle of the support beam 140. This additional leveling solves the problem that a tilt of the entire carriage assembly would otherwise cause a twist in the primary and take-away conveyors.

Once a coop 126 is emptied, the primary index 106 is completely retracted and the gantry 110, carriage assembly 111 and platforms are raised or lowered to the next coop. When a column of coops are unloaded, the truck positioner 102 is activated (discussed below) and pulls the transport vehicle into position for the next column to be unloaded.

FIG. 19*a* shows the primary take away conveyor 108 coupled to the inclined take away conveyor 112. The point of transfer of the livestock between the primary index 106 and the primary take-away conveyor 108 in this embodiment is similar to the previous embodiment. (See FIG. 8 and its associated discussions, supra.) Once the livestock have crossed the point of transfer, they are gently transported via the inclined take-away conveyor 112. More specifically, the trek of the unloaded livestock begins with their unloading from the coop 126 via the primary index 106 and transferred to the primary take-away conveyor 108, through the point of transfer, and then directly to the inclined take-away conveyor 112. When they reach the discharge end 141 of the inclined take-away 112, they are then transported as required by the particular set-up of the form or processing plant (customer). In particular, the inclined take-away conveyor 112 ends at the customer's support structure 142 (FIGS. 13-14). The support structure 142 maintains the discharge end 141 at a height that is equal distance of the middle height of the coop module of the transport vehicle. The support further allows the inclined take away conveyor to move back and forth on hinged upright members 144. Again, depending upon the particular customer, the support member 142 may be the beginning of another conveyance or the start of a down line processing such as that discussed with respect to FIG. 12.

Turning now to the operation of the truck positioner 102 and FIG. 20, the principle components thereof are shown with this top view. The transport vehicle 100 enters the truck positioner 102 (which is securely attached to the ground) via on-ramps 122. The truck positioner may be supported by the ground or the ground may be the support for the truck. The basic operation of the truck position is that once the vehicle is joined or locked to the hitch assembly 146, the push assembly 148 pushes the vehicle exactly one coop width 150 or other predetermined distance. Once all of the coops are emptied (as previously discussed) the vehicle is unlocked from the hitch assembly 146, and can exit the truck positioner 102 via off ramps 152.

FIGS. 21 and 22 depict the component parts of both the hitch assembly 146 and the push assembly 148. The track 151 (FIG. 20) that everything rides on is not shown in all the figures so that the assemblies can be seen more clearly. The hitch assembly includes the shoe 153 and the nose positioner 154 which is attached to the end of the push bar 156 or other movable element. During positioning, the coupler 158 grips or engages the push bar 156 by sliding its front and rear dogs (160, 162) into a front and rear notch pair (164, 166), or other indentations, respectively. The main cylinders 168 of the push assembly 148 then pushes the coupler 158, which pushes the push bar 156, which pushes the hitch assembly 146 and therefore the transport vehicle 100 one coop width 150. The main cylinders 168 are capable of finer adjustments via the fine adjustment cylinders 170. The fine adjustment cylinders are anchored by the stationary plate 172 and can further adjust the position of the transport vehicle 100 through their connection with the fine adjustment shuttle 174. Once the cylinders (168 and 170) have accurately positioned the transport vehicle 100, the brake 176 is applied and the push bar 156 is held in place during the unloading process. When ready to move on to the next column of coops, the dogs (160 and 162) are slid out of the notches (164 and 166) and the coupler 158 is retracted to the next pair of notches on the push bar 156. The dogs (160 and 162) are slid into those notches, the brake 176 is released and the machine is ready to move the transport vehicle 100 another coop width 150.

The coupling between the transport vehicle 100 and the truck positioner 102 is best illustrated by FIG. 23. Referring thereto, FIG. 23*b* illustrates an exploded view of the preferred embodiment of hitch 178 showing the component parts thereof, including the shoe plate 180, bolt assembly 182 and the height adjustment cylinder 184. It will be understood that many possibilities exist to couple the transport vehicle 100 to the truck positioner 102, however, with respect to FIG. 23*b* and in order to operate the truck positioner 102, the hitch 178 is coupled to the front end 186 of the transport vehicle 100 via the bolt assembly 182, and the shoe plate 180 is securely attached to the shoe 153 of the hitch assembly 146. Upon a secure connection, the truck positioner can now position the transport vehicle 100 (and thus the coops) for the proper unloading process.

While particular embodiments of the invention have been shown and described, it will be obvious to those skilled in the art that changes and modifications may be made therein without departing from the invention in its broader aspects, and, therefore, the aim in the appended claims is to cover all such changes and modifications as fall within the true spirit and scope of the invention.

We claim:

1. A vehicle positioning apparatus for positioning a vehicle adjacent a stationary livestock unloader, the apparatus comprising:

a vehicle support surface;

an anchored assembly having a movable member for traveling parallel to said surface;

a joining member for attaching the vehicle to said movable member;

a push assembly for pushing said movable member a predetermined distance thereby also moving the attached vehicle, said push assembly includes at least one main cylinder capable of extending and retracting, said main cylinder having a means for coupling said movable member on one end whereby extension of said main cylinder pushes said movable member; and wherein said movable member includes spaced indentations capable of cooperating with said means for coupling such that said push assembly engages said movable member, moves said movable member a predetermined distance upon extension, uncouples and retracts, and again engages said movable member.

2. A vehicle positioning apparatus as defined in claim 1 wherein said vehicle support surface includes at least one ramp.

3. A vehicle positioning apparatus as defined in claim 1 wherein said joining member includes a hitch assembly for locking the vehicle to said movable member.

4. A vehicle positioning apparatus as defined in claim 1 wherein said push assembly includes a brake for holding the position of said movable member.

5. A vehicle positioning apparatus as defined in claim 1 wherein said push assembly includes at least one secondary cylinder capable of extending and retracting, said secondary cylinder capable of providing finer positioning then said main cylinder.

6. A system for unloading livestock from a vehicle, the system comprising:
- a stationary unloader unit having a base and a primary index, said primary index capable of extending into and retracting out of a storage unit of said vehicle;
- a vehicle support surface adjacent said unloader unit;
- an anchored assembly having a movable member for traveling parallel to said surface;
- a joining member for attaching the vehicle to said movable member; and
- a push assembly for pushing said movable member a predetermined distance thereby also moving the attached vehicle, said push assembly includes at least one main cylinder capable of extending and retracting, said main cylinder having a means for coupling said movable member on one end whereby extension of said main cylinder pushes said movable member; and
- wherein said movable member includes spaced indentations capable of cooperating with said means for coupling such that said movable push assembly engages said movable member, moves said member a predetermined distance upon extension, uncouples and retracts, and again engages said movable member.

7. A system for unloading livestock as defined in claim 6 wherein said primary index includes a telescopic conveyor section movably mounted to and supported by said base, said telescopic conveyor section positioned generally parallel to said support surface and having a length, a livestock receiving end and a discharge end, said receiving end extendable from and retractable to said base.

8. A system for unloading livestock as defined in claim 7 further including an elevating support member movably mounted to said base for elevating said index.

9. A system for unloading livestock as defined in claim 8 further including a mobile conveyor discharge belt section having a first end pivotably attached to said elevating support member to provide for a first point of transfer between said discharge end and said mobile conveyor discharge belt section, said mobile conveyor discharge belt section having a second end adaptable to traversing a surface.

10. A system for unloading livestock as defined in claim 9 further including a stationary discharge conveyor section for conveying the livestock for further processing, said second end of said mobile conveyor discharge belt section movably mounted to said stationary discharge conveyor section to provide a second point of transfer.

11. A system for unloading livestock as defined in claim 6 wherein said push assembly includes a brake for holding the position of said movable member.

12. A system for unloading livestock as defined in claim 6 wherein said push assembly includes at least one secondary cylinder capable of extending and retracting, said secondary cylinder capable of providing finer positioning then said main cylinder.

* * * * *